United States Patent
Appia et al.

(10) Patent No.: US 8,718,356 B2
(45) Date of Patent: May 6, 2014

(54) METHOD AND APPARATUS FOR 2D TO 3D CONVERSION USING SCENE CLASSIFICATION AND FACE DETECTION

(75) Inventors: Vikram Appia, Atlanta, GA (US);
Rajesh Narasimha, Plano, TX (US);
Aziz Umit Batur, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 426 days.

(21) Appl. No.: 13/215,833

(22) Filed: Aug. 23, 2011

(65) Prior Publication Data

US 2012/0051625 A1    Mar. 1, 2012

Related U.S. Application Data

(60) Provisional application No. 61/375,926, filed on Aug. 23, 2010.

(51) Int. Cl.
*G06K 9/00* (2006.01)
(52) U.S. Cl.
USPC ............ 382/154; 348/42; 345/419; 356/12
(58) Field of Classification Search
CPC .......... H04N 13/0207; H04N 13/0271; H04N 13/026; H04N 5/2226
USPC ............ 382/154; 345/419–427; 356/12–14; 348/42–60
See application file for complete search history.

(56) References Cited

U.S. PATENT DOCUMENTS

| | | | |
|---|---|---|---|
| 8,411,932 B2 * | 4/2013 | Liu et al. ................ | 382/154 |
| 2008/0278487 A1 * | 11/2008 | Gobert ................ | 345/420 |
| 2010/0080448 A1 * | 4/2010 | Tam et al. ................ | 382/154 |
| 2010/0182410 A1 * | 7/2010 | Verburgh et al. ............ | 348/51 |
| 2012/0051625 A1 * | 3/2012 | Appia et al. ................ | 382/154 |
| 2012/0069007 A1 * | 3/2012 | Pegg et al. ................ | 345/419 |
| 2012/0294521 A1 * | 11/2012 | Lee et al. ................ | 382/164 |
| 2013/0044912 A1 * | 2/2013 | Kulkarni et al. ............ | 382/103 |

* cited by examiner

*Primary Examiner* — Aaron W Carter
(74) *Attorney, Agent, or Firm* — Mima Abyad; W. James Brady; Frederick J. Telecky, Jr.

(57) ABSTRACT

A method and apparatus for converting a two dimensional image or video to three dimensional image or video. The method includes segmenting objects in at least one of a two dimensional image and video, performing, in the digital processor, a depth map generation based on low-level features, performing face detection and scene classification on at least one of a two dimensional image and video, and utilizing face detection and scene classification in enhancing the depth map and for converting the at least one of a two dimensional image and video to three dimensional image and video.

3 Claims, 2 Drawing Sheets

METHOD AND APPARATUS FOR 2D TO 3D CONVERSION USING SCENE CLASSIFICATION AND FACE DETECTION

CROSS-REFERENCE TO RELATED APPLICATIONS

This application claims benefit of U.S. provisional patent application Ser. No. 61/375,926, filed Aug. 23, 2010, which is herein incorporated by reference.

BACKGROUND OF THE INVENTION

1. Field of the Invention

Embodiments of the present invention generally relate to a method and apparatus converting two dimensional (2D) to three dimensional (3D) utilizing scene classification and face detection for depth map enhancement in 3D image or video.

2. Description of the Related Art

Generating 3D content from stereo image pairs has become considerably important in the recent past 2D to 3D conversion techniques are alternatives to obtain 3D content from the existing 2D content either in the image/video format.

Existing 2D to 3D conversion techniques use only low level feature to generate depth map which leads to uncomfortable viewing experience and causes headache. Therefore, there is a need for an improved method and/or apparatus for 2D to 3D conversion in images and/or video.

SUMMARY OF THE INVENTION

Embodiments of the present invention relate to a method and apparatus for converting a two dimensional image or video to three dimensional image or video. The method includes segmenting objects in at least one of a two dimensional image and video, performing, in the digital processor, a depth map generation based on low-level features, performing face detection and scene classification on at least one of a two dimensional image and video, and utilizing face detection and scene classification in enhancing the depth map and for converting the at least one of a two dimensional image and video to three dimensional image and video.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

One embodiment proposes an unsupervised algorithm that incorporates high level image features like face detection, sky detection and foliage detection to enhance the depth map obtained for 2D to 3D conversion. Thus, different values of depth are assigned to the various regions/objects in a given 2D image/scene. Utilizing a Depth Based Image Rendering (DBIR) algorithm, two different views (the stereo pair) are generated. To assign a value of depth to the various regions within the image, these algorithms rely on low level features like texture, focus/blur, object size, position etc. These features are not very reliable indicators of depth and, thus, they generate inaccurate depth maps. Using such flawed depth maps will create various artifacts in the rendered 3D image.

Imperfections in object segmentation may create disturbing artifacts, such as, geometric inconsistencies and shearing in the anaglyph/3D image. High level features are used to rectify these imperfections, to create an enhanced depth map and, hence, to improve the overall viewing experience.

Figure 1:
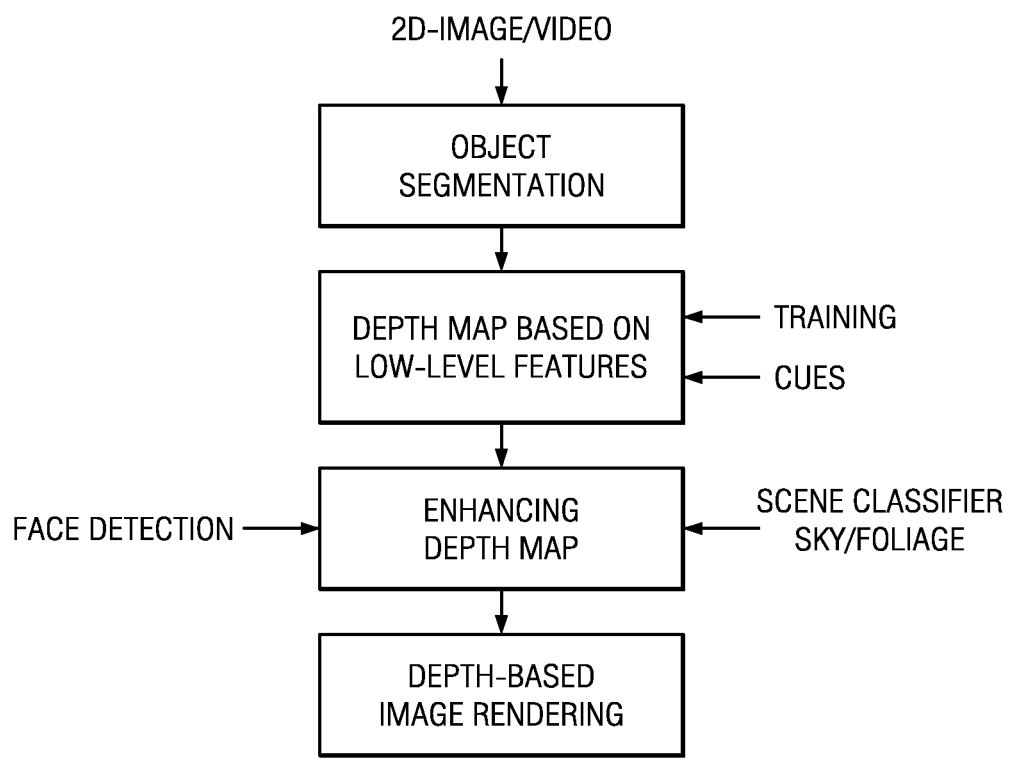
FIG. 1 is an embodiment of a flow diagram of a method for 2D to 3D conversion.

FIG. 1 is an embodiment of a flow diagram of a method for 2D to 3D conversion. In one embodiment, all current state-of-the-art algorithms use the low-level features to create a depth map and use it to generate the anaglyph/3D image. The method receives a 2D input of images or video. The method performs object segmentation. Utilizing training and cues, the method calculates the depth map based on low-level features. The method performs face detection and scene classification; accordingly, the method enhances the depth map to produce depth-based image rendering. Such method may be performed in any image or video capturing device or in any apparatus that displays or enhances 3D images and/or video.

Figure 2:
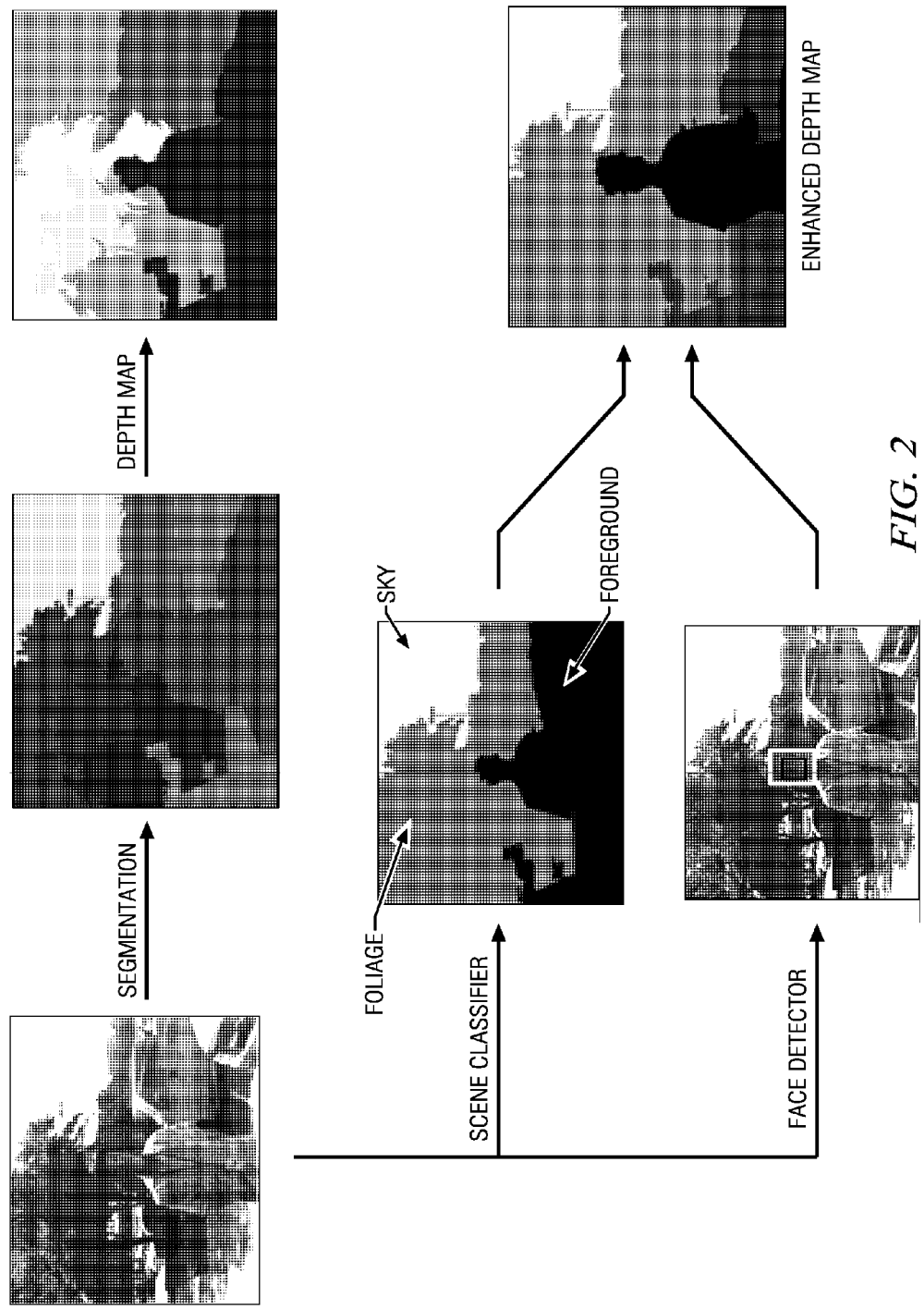
FIG. 2 is an embodiment of 2D to 3D conversion utilizing the method of FIG. 1.

FIG. 2 is an embodiment of 2D to 3D conversion utilizing the method of FIG. 1. The image is segmented into various regions using a mean shift clustering algorithm. This algorithm uses the color and edge information in the image to segment the image into various regions of interest. The next step is to assign a depth value to each region based on a combination of the low level features like gradient, location and training data etc. In the depth map, darker regions are closer to a capturing device and the brighter regions are farther away from the camera. In the depth map generated, various flaws may appear in the depth assignment. For example, people in the image have been segmented into various regions and each region has been assigned a different value of depth. As a result, in the final output, a person in the 3D image looks sheared at different parts. This will generate a very unpleasant viewing experience. Also, as shown in FIG. 2, the sky has been assigned a depth value closer to the camera, than the person standing in the image. Similarly, the trees have been assigned depth values farther away from the sky. All these flaws will manifest as irregularities/inconsistencies in the 3D image, leading to an uncomfortable viewing experience.

To overcome these flaws, we propose to use high-level features (object recognition/scene classification). FIG. 2 also illustrates the output of the scene classifier and the face detector. The sky and the foliage may be pushed to the background by assigning high depth values to them once their regions are detected and classified. Then, we use the location of the faces to connect them to the corresponding bodies of people in the image and bring them closer to the camera (assign lower depth). This will result in the enhanced depth map shown in the figure.

Using high level features removes the inconsistencies that existed in the initial depth map, which in turn will render a pleasant 3D viewing experience. The face detector and the scene classifier may be implemented successfully on a lower resolution image as well. Hence, the time constraints of real-time implementation for video can be met easily. In another embodiment, this solution is implemented to 3D image and video generation from 2D content and QQVGA sized images.

While the foregoing is directed to embodiments of the present invention, other and further embodiments of the invention may be devised without departing from the basic scope thereof, and the scope thereof is determined by the claims that follow.

What is claimed is:

1. A method of a digital processor for converting a two dimensional image to three dimensional, comprising:
   segmenting objects in at least one of a two dimensional image and video;
   performing, in the digital processor, a depth map generation based on low-level features;
   performing face detection and scene classification on at least one of a two dimensional image and video; and
   utilizing face detection and scene classification in enhancing the depth map and for converting the at least one of a two dimensional image and video to at least one of three dimensional image and video, respectively.

2. An apparatus for converting a two dimensional image to three dimensional, comprising:
   means for segmenting objects in at least one of a two dimensional image and video;
   means for performing, in the digital processor, a depth map based on low-level features;
   means for performing face detection and scene classification on at least one of a two dimensional image and video; and
   means for utilizing face detection and scene classification in enhancing the depth map and for converting the at least one of a two dimensional image and video to at least one of a three dimensional image and video, respectively.

3. A non-transitory storage medium comprising computer instruction, when executed performs a method for converting a two dimensional image to three dimensional, the method comprising:
   segmenting objects in at least one of a two dimensional image and video;
   performing, in the digital processor, a depth map generation based on low-level features;
   performing face detection and scene classification on at least one of a two dimensional image and video; and
   utilizing face detection and scene classification in enhancing the depth map and for converting the at least one of a two dimensional image and video to at least one of a three dimensional image and video, respectively.

* * * * *